UNITED STATES PATENT OFFICE.

CHARLES L. LIGHTENHOME, OF NEW YORK, N. Y.

PROCESS FOR MAKING SUBSTITUTES FOR SHELLAC, VARNISH, AND RELATED PRODUCTS.

1,315,137.  Specification of Letters Patent.  Patented Sept. 2, 1919.

No Drawing.  Application filed May 18, 1918. Serial No. 235,302.

*To all whom it may concern:*

Be it known that I, CHARLES L. LIGHTENHOME, a citizen of the United States, residing at New York, in the county of New York and State of New York, have invented a new and useful Process for Making Substitutes for Shellac, Varnish, and Related Products, of which the following is a specification.

The object of my invention is to provide a novel process for making shellac, varnish and related products and of the novel driers to be used in the manufacture of such products as hereinafter described.

To illustrate the method of carrying out my invention I may for the manufacture of shellac take twenty-five pounds of a suitable grease or non-mineral oil such as tallow and heat it in a kettle until melted. I then add seventy-five pounds of a suitable gum, preferably some grade of Manila, kauri or copal gum, and heat the entire mass for about two hours at a temperature of not less than 300 nor over 600 degrees Fahrenheit, assuming that a kettle holding approximately 100 gallons is employed. After the gum is thus cut, I add a suitable quantity of colophony, preferably about 400 pounds, and melt it down at a temperature of approximately 400 degrees Fahrenheit for a period of about forty five minutes.

(To increase the strength of any of the products to be obtained by the process, I may omit the addition of colophony from the steps of the process.)

To the melted mass above described, I slowly add, meanwhile stirring the mass, not less than two per cent. and not over five per cent. of a novel drier, which may be either a gloss drier or a flat drier according to whether a glossy finish is desired or otherwise.

My novel gloss drier is a creamy mass made by adding manufacturers' pure nitric acid to calcium carbonate (or whiting) in the proportion of 126 parts of nitric acid to 100 parts of calcium carbonate.

In place of the gloss drier I may substitute a novel flat drier consisting of a semi-liquid made by adding hydrochloric or muriatic acid to the carbonate of calcium (or an inexpensive equivalent such as carbonate of magnesia, carbonate of iron or barium carbonate) to chemically combine and form the chlorid of the element, in the proportion of 73 parts of muriatic acid to 100 parts of clacium carbonate (or whiting). The flat drier is employed where a non-glossy finish is desired.

As the next step in the process for making shellac, when the drier is thoroughly incorporated in the mass I slowly stir into the mass twenty pounds of cottage cheese (casein) which has been dissolved in an alkali.

In the event that the finished product is not desired cut in solution, the product is taken in its melted state, following the addition of the drier, and while in a melted state the material is poured on two suitable revolving rollers, the rollers being suitably geared together so that the material is squeezed through the rollers in a thin sheet. This sheet is allowed to drop on a suitable endless conveyer which conveys it for six or eight feet to a bin or other receptacle. The sheet breaks into flakes as it cools and as it strikes the conveyer and in dropping into the bin. This flaked material or shellac, may then be dissolved cold in the liquid desired to bring it to a solution, said liquid being an alcohol or an alkali.

After the addition of the desired drier, there is added to the product a suitable evaporable liquid other than water, such as alcohol, or alcohol and benzin mingled if an exceptionally quick-drying liquid is necessary, for shellac.

The entire contents of the kettle will measure approximately fifty gallons and will weigh approximately five hundred pounds.

In the manufacture of varnish the process is substantially as above described but with the omission of the final step of adding casein. The customary addition of linseed oil, however, is made by using a linseed oil prepared with my new drier.

In the manufacture of related products, such as gloss and flat oils, I employ rosin in connection with my drier as above described, and then thin the product with gasolene or benzin or mineral naphtha or a coal tar naphtha or any quickly evaporating liquid suitable as a menstruum to apply the materials used. Another related product which may be produced by my process is paint oil, which is made by the use of rosin and my drier as described, the mass then being thinned with kerosene oil, or one of the distillates, or a paraffin oil to the consistency desired.

In general, my process consists of bringing gums, hard resins, or any resin other than colophony into a solution or cut to a thick liquid while hot by dissolving the gum in a non-mineral oil (grease, vegetable oils or animal oils being available); adding colophony in a suitable proportion, namely not less than one per cent. nor over fifty per cent. (except when it is desired to omit this step for the purpose of adding strength to the material); then adding my drier, said drier consisting of one of the alkali carbonates treated with an acid, namely, hydrochloric acid for a flat drier, or nitric acid for a gloss drier; thereafter thinning the product with a suitable liquid, which may be alcohol, turpentine, benzin, gasolene, solvent naphtha, or in fact any quickly evaporating liquid lighter than water which will permit of the above mentioned gum product adhering to the surface to which it may be applied after the drier has performed its function. If in any instance it is desired that the solution to be obtained as a final product be cloudy or translucent in appearance, there is added before thinning down with the above-mentioned quickly evaporating liquid a suitable proportion (not less than one nor over fifty per cent.) of a thick pasty liquid made by dissolving cottage cheese (casein) in an alkali, such as ammonia, or a carbonate or bicarbonate of an alkali element.

The product obtained by my process is suitable for use in the manufacture of disk records and hard rubber products for insulating purposes when combined with the usual added ingredients employed in the manufacture of such products. The product obtained by my process may be employed for all purposes for which shellac is used.

What I claim is:

1. The process for bringing gums, hard resins or any resin other than colophony into a solution while hot by cutting the above mentioned gums in a non-mineral oil; adding thereto colophony; adding to the cut product a drier, said drier consisting of an alkaline earth carbonate treated with an acid; then thinning this product with a light, quick drying solvent whereby to produce a product that will adhere to the surface to which it may be applied after the drier has performed its function.

2. The process for bringing gums, hard resins or any resin other than colophony into a solution while hot by cutting the above mentioned gums in a non-mineral oil; adding to the cut product a drier, said drier consisting of an alkaline earth carbonate treated with an acid; then thinning this product with a light, quick drying solvent whereby to produce a product that will adhere to the surface to which it may be applied after the drier has performed its function.

3. The process for bringing gums, hard resins or any resin other than colophony into a solution or cut to a thick liquid while hot by cutting the above mentioned gums in a non-mineral oil; adding colophony thereto; adding to the aforesaid product a drier consisting of an alkaline earth carbonate treated with an acid; adding a thick pasty liquid consisting of cottage cheese (casein) dissolved in an alkali to give the mass a translucent appearance; then thinning the product with a light, quick drying solvent.

4. The process for bringing gums, hard resins or any resin other than colophony into a solution or cut to a thick liquid while hot by cutting the above-mentioned gums in a non-mineral oil; adding to the cut product a drier consisting of an alkaline earth carbonate treated with an acid; adding a thick pasty mass consisting of cottage cheese (casein) dissolved in an alkali; and thinning the product with alcohol.

5. The process for producing a flaked shellac substitue, consisting of bringing a gum while hot into a solution by cutting the gum with a grease, adding colophony to the heated mass; slowly stirring a drier into the melted mass above obtained, said drier consisting of a creamy mass made by treating calcium carbonate with nitric acid and suitably flaking the product, whereby a product is obtained suitable for conversion to liquid form by the addition of alcohol or an alkali at a subsequent time.

6. The process for producing a flaked shellac substitute, consisting of bringing a gum while hot into a solution by cutting the gum with a grease; slowly stirring a drier into the melted mass, said drier consisting of a creamy mass made by treating calcium carbonate with nitric acid and suitably flaking the product, whereby a product is obtained suitable for conversion when desired to liquid form by the addition of alcohol or an alkali.

CHARLES L. LIGHTENHOME.